United States Patent
Takijiri

(10) Patent No.: US 9,075,414 B2
(45) Date of Patent: Jul. 7, 2015

(54) PRESSURE CONTROL DEVICE, FLOW RATE CONTROL DEVICE AND RECORDING MEDIUM HAVING PROGRAMS USED FOR PRESSURE CONTROL DEVICE, RECORDING MEDIUM HAVING PROGRAMS USED FOR FLOW RATE CONTROL DEVICE

(71) Applicant: HORIBA STEC, Co., Ltd., Kyoto-shi, Kyoto (JP)

(72) Inventor: Kotaro Takijiri, Kyoto (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 204 days.

(21) Appl. No.: 13/935,437

(22) Filed: Jul. 3, 2013

(65) Prior Publication Data
US 2014/0007950 A1    Jan. 9, 2014

(30) Foreign Application Priority Data
Jul. 3, 2012    (JP) ................. 2012-149988

(51) Int. Cl.
*F16K 31/02*    (2006.01)
*G05D 7/06*    (2006.01)
*G05D 16/20*    (2006.01)

(52) U.S. Cl.
CPC .............. *G05D 7/0617* (2013.01); *G05D 16/20* (2013.01); *G05D 7/0635* (2013.01); *G05D 16/2013* (2013.01)

(58) Field of Classification Search
CPC . G05D 7/0617; G05D 7/0635; G05D 7/0623; G05D 16/20; G05D 16/2013; F02D 41/2483; F16K 7/123; Y10T 29/49826; Y10T 29/49405
USPC ................. 137/487.5, 485, 486; 73/861.42; 118/715; 156/345.26
See application file for complete search history.

(56) References Cited

U.S. PATENT DOCUMENTS

| | | | |
|---|---|---|---|
| 6,119,710 A * | 9/2000 | Brown .......................... 137/14 |
| 6,655,408 B2 * | 12/2003 | Linthorst ................... 137/487.5 |
| 6,913,031 B2 * | 7/2005 | Nawata et al. .................. 137/12 |
| 6,962,164 B2 * | 11/2005 | Lull et al. ........................... 137/2 |
| 7,723,700 B2 * | 5/2010 | Horsky et al. ................. 250/429 |

(Continued)

FOREIGN PATENT DOCUMENTS

| | | | | |
|---|---|---|---|---|
| DE | 3836613 A1 * | 5/1990 | ............ G05D 16/00 |
| JP | 2001241841 A | 9/2001 | |

*Primary Examiner* — John K Fristoe, Jr.
*Assistant Examiner* — Minh Le
(74) *Attorney, Agent, or Firm* — Alleman Hall McCoy Russell & Tuttle LLP

(57) ABSTRACT

To provide a pressure control device that can prevent ringing and overshoot without changing gain even with a high gain setting, can quickly change pressure to a steady state even with a large set pressure value, and can equalize the time required from an initial to steady state regardless of the set pressure value, a valve control part is provided that includes an open degree operated amount output part that outputs an open degree operated amount based on a measured pressure value and a set pressure value, and a limiter part that sets an upper limit value of the open degree operated amount according to the set pressure value and that controls a pressure control valve by the open degree operated amount of the upper limit value when the open degree operated amount exceeds the upper limit value.

7 Claims, 10 Drawing Sheets

(56) References Cited

U.S. PATENT DOCUMENTS

| | | | |
|---|---|---|---|
| 8,079,383 B2 * | 12/2011 | Ding | 137/487.5 |
| 8,307,845 B2 * | 11/2012 | Kouchi et al. | 137/486 |
| 8,321,060 B2 * | 11/2012 | Smirnov et al. | 700/282 |
| 2005/0115502 A1 * | 6/2005 | George et al. | 118/715 |
| 2007/0016333 A1 * | 1/2007 | Edwards et al. | 700/282 |
| 2008/0050538 A1 * | 2/2008 | Hirata | 427/585 |
| 2011/0108126 A1 * | 5/2011 | Monkowski et al. | 137/12 |
| 2012/0197446 A1 * | 8/2012 | Glaudel | 700/282 |

* cited by examiner

PRESSURE CONTROL DEVICE, FLOW RATE CONTROL DEVICE AND RECORDING MEDIUM HAVING PROGRAMS USED FOR PRESSURE CONTROL DEVICE, RECORDING MEDIUM HAVING PROGRAMS USED FOR FLOW RATE CONTROL DEVICE

TECHNICAL FIELD

This invention relates to a pressure control device to control a pressure of a fluid, a flow rate control device to control a flow rate of the fluid by controlling the pressure of the pressure control device, a recording medium having programs used for the pressure control device, and a recording medium having programs used for the flow rate control device.

BACKGROUND

For a semiconductor manufacturing process, a pressure control device is used for introducing a fluid such as a material gas at a predetermined constant pressure into a chamber that is maintained in vacuum.

More specifically, the pressure control device is arranged in the upstream side of the chamber in the flow channel, and comprises a pressure sensor, a pressure control valve and a valve control part that controls the pressure control valve so as to make a measured pressure value measured by the pressure sensor at a set pressure value.

Conventionally, only an accuracy of the pressure control in a steady state at a time when a predetermined period of time passes from an initial state is regarded as important for the pressure control of the fluid by the pressure control device, however, recently an accuracy of the pressure control or a responsiveness in a transition state which is a time period between an initial state and a steady state is also regarded as important.

For example, in a semiconductor manufacturing process, it is required to further improve the accuracy or the responsiveness of the pressure control in the transition state while a response time which is a time period from the initial state to the steady state is shortened as much as possible. More concretely, if the set pressure value is large, the flow rate of the fluid required to be filled into the chamber also becomes large. As this result, there is a problem that the responsiveness is decreased because the response time becomes longer compared with a case that the set pressure value is small.

One method to solve the problem represented improves the responsiveness of the pressure control by setting a large value as the PID coefficient (gain) in a case where the valve control part controls the open degree operated amount of the pressure control valve by means of the PID control.

However, if a large value is simply set as the gain, such as the PID coefficient, in a case where the set pressure value is large, it is possible to shorten the response time because a large value of the open degree operated amount is input. However, in a case where the set pressure value is a target value that is small, the pressure control might be unstable because the pressure control valve is controlled at an excessive open degree operated amount although it is unnecessary to fill the fluid into the chamber so much. In other words, if the PID coefficient is determined to be large based on the large set pressure value as a reference, in a case where the set pressure value is small, the stability of the control is lost so that ringing might be generated or a big overshoot might be generated in the transition state as shown in FIG. 10. In order to make it possible to realize both the good responsiveness and the good stability at all of the set pressure values, the PID coefficient is changed according to the set pressure value. However, with this arrangement, since it is necessary to experimentally determine the PID coefficient for each of the set pressure values, it becomes very troublesome to adjust the parameter.

Meanwhile, Patent Document 1 discloses a pressure control device wherein an upper limit value (a limit) is provided for the open degree operated amount of the pressure control valve in the transition state without changing the PID coefficient according to the set pressure value so as not to produce overshoot and to obtain the preferable responsiveness.

This pressure control device comprises a PID control part that conducts a PID calculation on the deviation between the set pressure value and the measured pressure value and that outputs the open degree operated amount of the pressure control valve and a limiter part that sets an upper limit value to the open degree operated amount output by the PID control part during a transition response period from an initial state, which is a time of initiation of raising the pressure to a steady state.

The limiter part is so configured that the upper limit value of the open degree operated amount is increased in proportion to the elapsed time from the time of the initiation of raising the pressure to the steady state. More specifically, in a case where the pressure control valve is continuously controlled at the open degree operated amount of the upper limit value from the time of the initiation of raising the pressure, the open degree gradually increases in accordance with the elapsed time.

However, with this arrangement, since the upper limit value of the open degree operated amount of the pressure control valve is fixed regardless of the elapsed time from the time of the initiation of raising the pressure, the time period to reach the steady state changes largely depending on the set pressure value. Concretely, even though the set pressure value is set at a large value such as 100% and it is required to raise the pressure to the set pressure value in a short period of time, since the limiter part sets the upper limit value of the open degree operated amount at a small value at a time of initiation of raising the pressure, the fluid does not flow into the downstream side so much so that the rising amount of the pressure also becomes small. As a result of this, in a case where the set pressure value is large, the response time to reach the steady state becomes longer as compared with a case in which the set pressure value is set at 50% or the like.

On the other hand, as shown in the patent document 1, if the upper limit value of the open degree operated amount is changed according to the elapsed time, the response time from the initial state to the steady state varies depending on the set pressure value so that it is not possible to maintain the response time. As a result, in the semiconductor manufacturing process, the longest time period until reaching the steady state is set as a waiting period so as to make it possible to introduce the material gas stably into the chamber, however, especially in a case where the set pressure value is small, an unnecessary waiting time is generated so that a yield is lowered.

In addition, the above-mentioned problems are also generated for a flow rate control device on a pressure basis that conducts a flow rate control based on a measured flow rate value output by the flow rate sensor of pressure type. More specifically, in a case of the flow rate sensor of pressure type, the flow rate is measured based on the pressure in the upstream side and the pressure in the downstream side of the fluid resistance where the pressure loss is generated, if the chamber is connected in the downstream side, the pressure in the downstream side is maintained generally in vacuum or at a constant value so that it becomes substantially equal to control the pressure value of the fluid in the upstream side of the fluid resistance. Accordingly, if the PID coefficient is set to be large in order to shorten the response time even though the set flow rate is large similar to the above-mentioned pressure control device, a problem of generating overshoot or ringing might be generated because the stability is lost in a case where the set flow rate is small.

PRIOR ART DOCUMENT

Patent Document

Patent Document 1: Japanese Unexamined Patent Application Publication No. 2001-241841

SUMMARY

Problems to be Solved by the Invention

The present claimed invention intends to solve all of the problems and a main object of this invention is to provide a pressure control device and a recording medium having programs used for the pressure control device that can prevent ringing or overshoot without changing gain even though the gain such as the PID coefficient is set large, that can change the pressure to the steady state in a short period of time even though the set pressure value is large and that can maintain the time period required from the initial state to the steady state regardless of the set pressure value. In addition, the object is to provide a flow rate control device and a recording medium having programs used for the flow rate control device that can solve technical problems corresponding to pressure control in controlling the flow rate.

Means to Solve the Problems

More specifically, the pressure control device of this invention comprises a pressure sensor that measures a pressure of a fluid flowing in a flow channel, a pressure control valve arranged in the flow channel, and a valve control part that controls the pressure control valve so as to make a measured pressure value measured by the pressure sensor at a set pressure value, and is characterized in that the valve control part comprises an open degree operated amount output part that outputs an open degree operated amount of the pressure control valve based on the measured pressure value and the set pressure value, and a limiter part that sets a tolerance of the open degree operated amount by setting a limit value of the open degree operated amount and that controls the pressure control valve at the open degree operated amount of the limit value in a case where the open degree operated amount output by the open degree operated amount output part is out of the tolerance, and the limiter part sets the limit value of the open degree operated amount according to the set pressure value.

"The open degree operated amount" in this specification is an amount indicating an absolute open degree of the pressure control valve.

In accordance with this arrangement, in a case of controlling a pressure increase, since the limiter parts sets the tolerance of the open degree operated amount by setting the limit value of the open degree operated amount according to the set pressure value, it is possible to shorten the time period until the steady state by setting the upper limit value large as the limit value of the open degree operated amount in a case where the set pressure value is large and there is a big margin until the overshoot is generated, or conversely, in a case where the set pressure value is small, it is possible to prioritize the stability by setting the upper limit value of the open degree operated amount small in an area where overshoot is generated immediately if the open degree operated amount is set too large.

In addition, since the limiter part controls the pressure control valve at the open degree operated amount of the set upper limit value in a case where the open degree operated amount output by the open degree operated amount output part exceeds the upper limit value, it is possible to prevent overshoot even though the gain such as the PID coefficient is set large. Furthermore, if the gain such as the PID coefficient is set large, it is possible to improve a follow-up performance or responsiveness to a command value in the transition state and the steady state.

Conversely, in a case of controlling a pressure decrease from a state maintained at a certain pressure value to the set pressure value, since the limiter part sets the tolerance of the open degree operated amount by setting the lower limit value as a limit value of the open degree operated amount according to the set pressure value, it is possible to shorten the response time regardless of the set pressure value and to prevent overshoot or ringing even though the pressure drop amount is small.

In a case where the open degree operated amount output by the open degree operated amount output part is less than or equal to the upper limit value of the open degree operated amount set by the limiter part, in order to make it possible to control the pressure in a state wherein both the responsiveness and the stability are secured, the limiter part may be so configured that an upper limit value is set as the limit value of the open degree operated amount, and in a case where the open degree operated amount that is output by the open degree operated amount output part is equal to or less than the upper limit value, the limiter part controls the pressure control valve at the open degree operated amount output by the open degree operated amount output part.

In order to generally maintain the time period from the initial state to the steady state regardless of the set pressure value, the limiter part may be so configured that the larger the set pressure value is, the larger the upper limit value of the open degree operated amount is set. In accordance with this arrangement, the larger the set pressure value is, the larger the upper limit value of the open degree operated amount is set. As a result of this, the larger the set pressure value is, the more the amount of the fluid passing the pressure control valve can be, so that the larger the set pressure value is, the larger the pressure change amount per unit time can be. As a result of this, it is possible to generally maintain the time from the initial state to the steady state in each of the set pressure values.

In order to generally maintain the time period from the initial state to the steady state regardless of the set pressure value by making a relationship between the set pressure value and the pressure change amount per unit time from the initial state to the steady state generally proportional, the limiter part may be so configured that the upper limit value of the open degree operated amount changes non-linearly to the set pressure value in the elapsed time. In accordance with this arrangement, even though the relationship between the open degree of the pressure control vale and the flow rate of the fluid passing the pressure control valve is non-linear, it is possible to determine the upper limit value of the open degree operated amount by accounting for the non-linearity of the relationship. As a result of this, it is possible to maintain the response time from the initial state to the steady state.

For example, in order to make it possible to keep the time period constant from the initial state to the steady state regardless of the set pressure value and irrespective of a volume of a chamber, which is an object whose pressure is to be controlled, the limiter part may be so configured to set the upper limit value of the open degree operated value according to the volume of the downstream side of the pressure control valve in the transition state.

In particular, in order to make it possible change the pressure from the initial state to the steady state in a short period of time while maintaining the responsiveness and the stability even though the volume of the downstream side of the pressure control valve is variable, the limiter part may be so configured such that the larger the volume of the downstream side of the pressure control valve is, the larger the upper limit value of the open degree operated amount is set.

A concrete example of a method for setting the upper limit value of the open degree operated amount in order to equalize the time period from the initial state to the steady state regardless of the set pressure value includes the limiter part so configured to set the open degree operated amount that corresponds to a flow rate value necessary to achieve a pressure in a volume in the downstream side of the pressure control valve to be the set pressure value at a time when a target time period passes after a time when the pressure control is initiated as the upper limit value.

In order to make it possible to realize a function as the pressure control device of this invention by rewriting programs of a conventional pressure control device, a recording media may use a recording medium having programs used for a pressure control device comprising a pressure sensor that measures a pressure of a fluid flowing in a flow channel and a pressure control valve arranged in the flow channel, and is characterized by comprising a valve control part that controls the pressure control valve so as to make a measured pressure value measured by the pressure sensor at a set pressure value, wherein the valve control part comprises an open degree operated amount output part that outputs an open degree operated amount of the pressure control valve based on the measured pressure value and the set pressure value, and a limiter part that sets a tolerance of the open degree operated amount by setting a limit value of the open degree operated amount and that controls the pressure control valve at the open degree operated amount of the limit value in a case where the open degree operated amount output by the open degree operated amount output part is out of the tolerance, and the limiter part sets the limit value of the open degree operated amount according to the set pressure value.

In order to make it possible to generally equalize the response time from the initial state to the steady state regardless of the size of the set flow rate value and to prevent overshoot or ringing, the flow rate control device may be a flow rate control device comprising a pressure sensor that measures a pressure of a fluid flowing in a flow channel, a flow rate control valve arranged in the flow channel, and a valve control part that controls the flow rate control valve so as to make a measured flow rate value calculated based on a measured pressure value measured by the pressure sensor at a set flow rate value, and is characterized in that the valve control part comprises an open degree operated amount output part that outputs an open degree operated amount of the flow rate control valve based on the measured flow rate value and the set flow rate value, and a limiter part that sets a tolerance of the open degree operated amount by setting a limit value of the open degree operated amount and that controls the flow rate control valve at the open degree operated amount of the limit value in a case where the open degree operated amount output by the open degree operated amount output part is out of the tolerance, and the limiter part sets the limit value of the open degree operated amount according to the set flow rate value.

In order to keep the response time constant regardless of the set flow rate value and to add a function of preventing overshoot or ringing by changing programs of a conventional flow rate control device, a recording media may use a recording medium having programs used for a flow rate control device comprising a pressure sensor that measures a pressure of a fluid flowing in a flow channel and a flow rate control valve arranged in the flow channel, and is characterized by comprising a valve control part that controls the flow rate control valve so as to make a measured flow rate value calculated based on a measured pressure value measured by the pressure sensor at a set flow rate value, wherein the valve control part comprises an open degree operated amount output part that outputs an open degree operated amount of the flow rate control valve based on the measured flow rate value and the set flow rate value, and a limiter part that sets a tolerance of the open degree operated amount by setting a limit value of the open degree operated amount and that controls the flow rate control valve at the open degree operated amount of the limit value in a case where the open degree operated amount output by the open degree operated amount output part is out of the tolerance, and the limiter part sets the limit value of the open degree operated amount according to the set flow rate value.

Effect of the Invention

In accordance with the pressure control device of this invention, since the upper limit value of the open degree operated amount of the pressure control valve is not changed according to the elapsed time from the initial state but determined according to the set pressure value by the limiter part, it is possible to equalize the time period from the initial state to the steady state even though the set pressure value varies. In addition, in a case where the open degree operated amount output by the open degree operated amount output part exceeds the upper limit value of the open degree operated amount set by the limiter part, the pressure control valve is controlled at the upper limit value. As a result of this, even though a case that the gain, such as the PID coefficient, is set large, it is possible not to generate overshoot.

DESCRIPTION OF THE REFERENCE CHARACTERS

Figure 1:
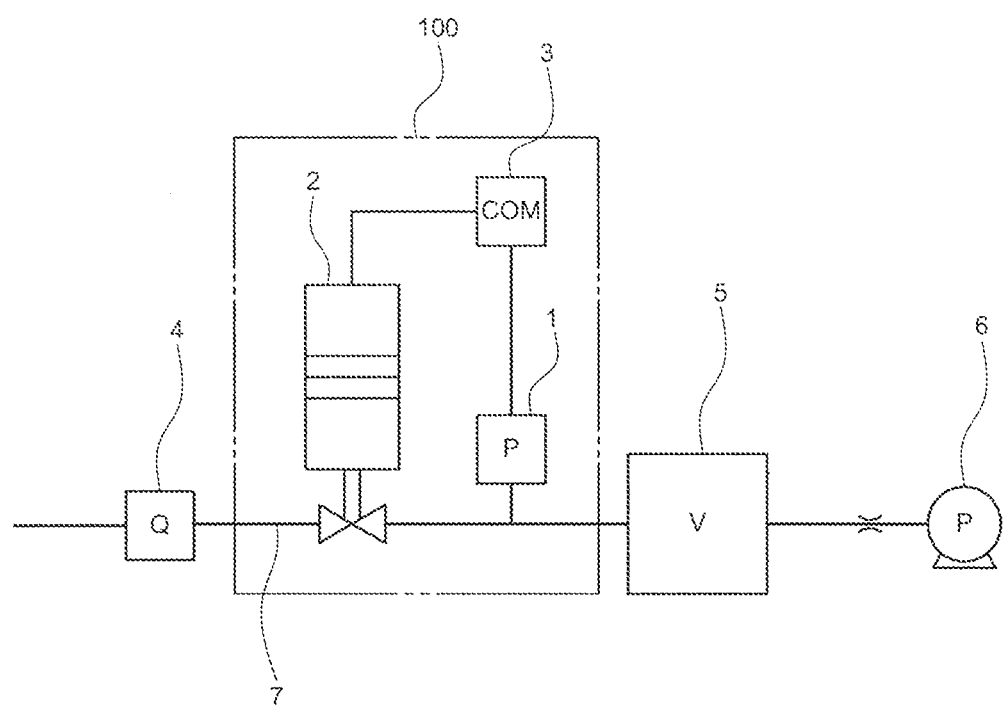
FIG. 1 is a schematic showing a pressure control device in accordance with a first embodiment of this invention.

100: pressure control device
1: pressure sensor
2: pressure control valve
3: valve control part
31: open degree operated amount output part
32: limiter part
4: flow rate sensor
5: chamber
6: vacuum pump
7: flow channel

DETAILED DESCRIPTION OF THE EMBODIMENTS

A first embodiment of this invention will be explained with reference to the drawings.

A pressure control device 100 of the first embodiment is used for introducing a fluid such as a material gas or a carrier gas at a predetermined constant pressure into a chamber 5 in a semiconductor manufacturing process, and arranged in an upstream side of the chamber 5. The pressure control device 100 of the first embodiment has not only a performance tracking characteristic in a steady state but also a characteristic of responsiveness or stability in a transition state, and is configured to be able to make a time period from an initial state to the steady state generally constant regardless of a set pressure value.

An outline of the above-mentioned semiconductor manufacturing process will be explained. As shown by a schematic in FIG. 1, a flow rate sensor 4 for monitoring a flow rate, the pressure control device 100, the chamber 5 having a predetermined volume, and a vacuum pump 6 for applying vacuum in the chamber 5 are arranged in this order from the upstream side.

Figure 2:
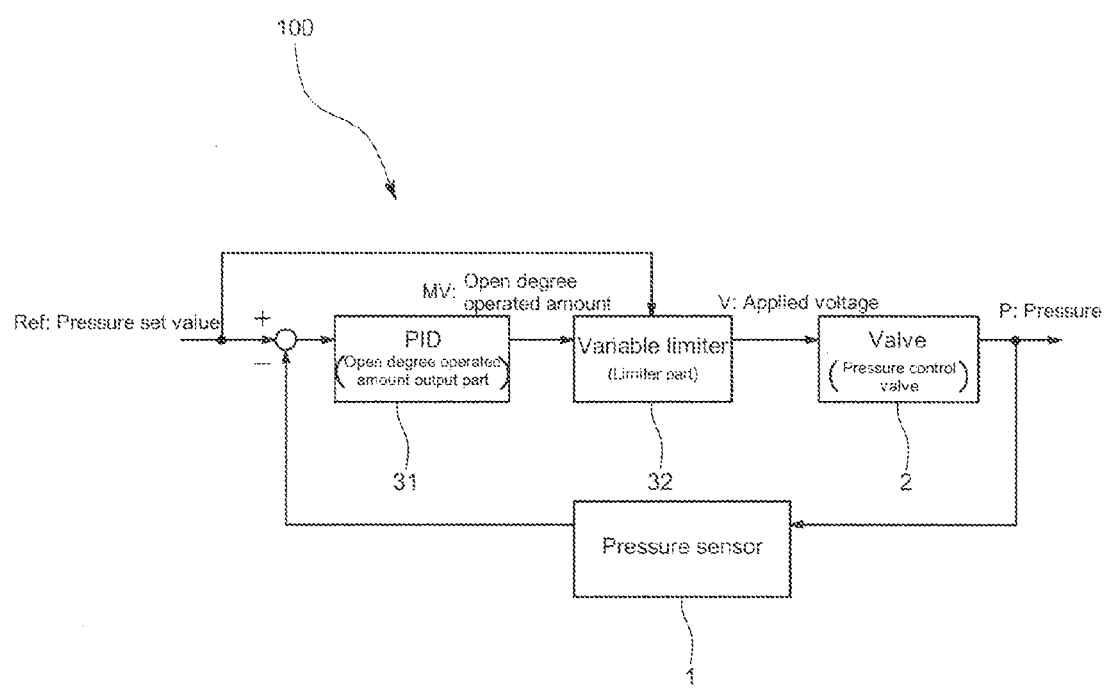
FIG. 2 is a block diagram showing a control system of the pressure control device in the first embodiment.

The pressure control device 100 comprises, as shown in FIG. 1, a pressure sensor 1 to measure a pressure of a fluid flowing in a flow channel 7, a pressure control valve 2 arranged in the flow channel 7 and a valve control part 3 to control the pressure control valve 2 based on a measured pressure value measure by the pressure sensor 1 and the set pressure value. The pressure control valve 2, the pressure sensor 1 and the valve control part 3 are configured to be a single module, and each component is housed in a casing, not shown in the drawings. It is possible to introduce the fluid at a predetermined pressure into the chamber 5 located in a secondary side by mounting an inlet and an outlet of the pressure control device 100 on the flow channel 7 of the semiconductor manufacturing process. In addition, a block diagram of a control system of the pressure control device 100 is shown in FIG. 2.

Each component of the pressure control device 100 will be explained.

The pressure sensor 1 is arranged in a downstream side of the pressure control valve 2 so as to measure a pressure in the flow channel 7 and the chamber 5.

The pressure control valve 2 is, for example, a solenoid valve. It is possible to change an open degree of the pressure control valve 2 by a voltage applied by the valve control part 3. More concretely, it is possible for the pressure control valve 2 to change from a state of 0% opening, which is a fully closed state, to a state of 100% opening, which is a fully open state. As shown by a graph in FIG. 3, a relationship between the open degree of the pressure control valve 2 and the flow rate of the fluid at a time of this open degree is of non-linear. More specifically, the relationship between the open degree and the flow rate of the flowing fluid shows a characteristic wherein the flow rate only rises gently while the open degree is small, the flow rate rises quickly when the open degree exceeds a predetermined open degree and the flow rate rises gently again when the open degree reaches near the fully open state. In the first embodiment, the pressure control is conducted considering this characteristic of the pressure control valve 2.

The valve control part 3 comprises a computer or a microcomputer comprising a CPU, a memory, an A/D converter, a D/A converter, an input/output devices or the like, and a function of the valve control part 3 is produced by executing programs stored in the memory. The valve control part 3 is so configured to control the pressure control valve 2 to make the measured pressure value measured by the pressure sensor 1 at the set pressure value, and has functions at least as an open degree operated amount output part 31 and a limiter part 32 shown by a block diagram in FIG. 2.

The open degree operated amount output part 31 is so configured to output the open degree operated amount of the pressure control valve 2 based on the measured pressure value and the set pressure value. The open degree operated amount indicates an absolute open degree of the pressure control valve 2. For example, in a case where the fully open opening degree is set 100% and the fully closed opening degree is set 0%, the open degree operated amount corresponds to a command value, a voltage value or a signal value corresponding to the numerical value from 0~100%. More specifically, the open degree operated amount is not a relative value indicating how much the open degree should be changed from the open degree of the pressure control valve 2 at the moment but the absolute value.

More concretely, the open degree operated amount output part 31 receives a deviation between the measured pressure value and the set pressure value as shown by the block diagram in FIG. 2, conducts a PID calculation on the deviation by the use of the previously determined PID coefficient and outputs the open degree operated amount to the limiter part 32. The same value of the PID coefficient used in the open degree operated amount output part 31 is used for the set pressure value in this embodiment on a constant basis, and the value of the PID coefficient is determined in consideration of, for example, a tolerance between the set pressure value and the measured pressure value in a steady state, a responsiveness in a transition state or a robustness against disturbance. Since the PID coefficient set in the open degree operated amount output part 31 is determined by giving priority to the responsiveness in the steady state and the stability against the disturbance, there is a possibility of generating ringing or overshoot in the transition state in a case where the open degree operated amount output by the open degree operated amount output part 31 is used as is.

The limiter part 32 is so configured to receive the set pressure value input as the command value, set an upper limit value (a limit value) of the open degree operated amount in accordance with the set pressure value and set the tolerance of the open degree operated amount, and in a case where the open degree operated amount exceeds the upper limit value, the pressure control valve 2 is controlled at the upper limit value of the open degree operated amount. In addition, in a case where the open degree operated amount output by the open degree operated amount output part 31 is smaller than or equal to the upper limit value, the limiter part 32 is so configured to control the pressure control valve 2 by the open degree operated amount output by the open degree operated amount output part 31. In other words, the limiter part 32 has functions as a limit value set part (not shown in the drawings) that sets the limit value in accordance with the set pressure value in the limiter part 32 and an open degree control part (not shown in the drawings) that controls the open degree of the pressure control valve 2 base on the limit value set by the limit value set part and the open degree operated amount output by the open degree operated amount output part 31.

Next, a configuration to set the tolerance of the open degree operated amount by determining the upper limit value of the open degree operated amount of the limiter part 32 will be explained in detail.

The limiter part 32 sets the upper limit value of the open degree operated amount in accordance with the set pressure value, the volume located in the downstream side of the pressure control valve 2 represented by a volume (V) of the chamber 5 in the first embodiment and the flow rate characteristic of the pressure control valve 2.

More concretely, in the first embodiment, the upper limit value of the open degree operated amount is determined based on the flow rate of the fluid necessary to achieve the set pressure during a target response time, which is a target value of the time from the initial state when the pressure control is initiated to the steady state when the pressure is maintained generally at a constant value near the set pressure value.

The flow rate necessary until reaching the set pressure value from the initial state can be calculated based on the equation of a state of a gas from the follow expression 1.

$$P_{set} - P_{start} = \frac{RT}{VM} \int_0^{tr} Q \, dt \quad \text{[Expression 1]}$$

where, $P_{set}$: set pressure value, $P_{start}$: pressure value of fluid in initial state, V: volume of chamber 5 (volume in downstream of pressure control valve 2), tr: target response time taken from initial state to steady state, R: gas constant, T: temperature of fluid, M: molecular weight of fluid, and Q: flow rate of fluid necessary until set pressure value is reached from initial state. In a case where $P_{start}$ is maintained generally in the vacuum state in the initial state, $P_{start}$ may be considered to be zero and the calculation may be conducted by using only $P_{set}$. Since inside of the chamber 5 is maintained generally in the vacuum state in this embodiment, $P_{start}$ is ignored.

Figure 4:
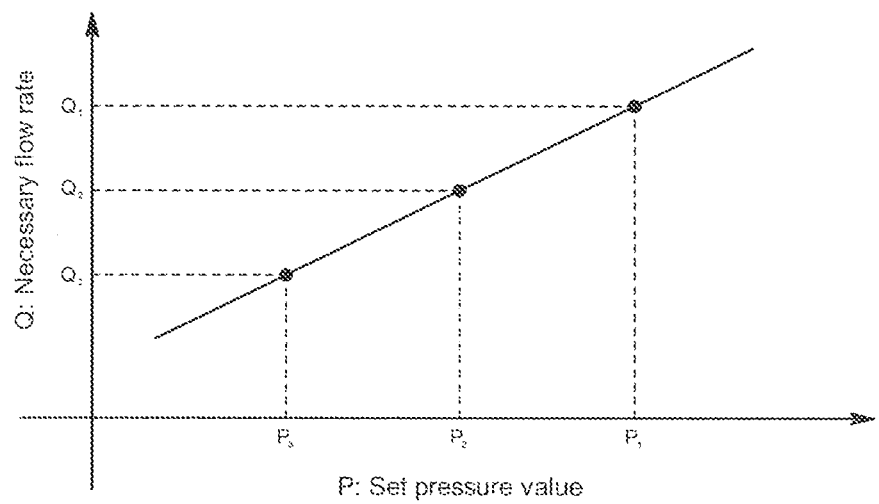
FIG. 4 is a graph showing a relationship between a set pressure value and a flow rate of a fluid to be required in the first embodiment.

Furthermore, if it is assumed that the open degree of the pressure control valve 2 is fixed to a predetermined open degree during a period from the initial state to the steady state, since the flow rate (Q) becomes constant, the expression 1 can be solved for (Q), and then (Q) is expressed by the expression 2.

$$Q = \frac{P_{set} V M}{RTtr} \quad \text{[Expression 2]}$$

where, since each of V, R, T, tr and M is a fixed value respectively, it turns out that there is a linear relation between the set pressure value ($P_{set}$) and the necessary flow rate (Q) as shown in FIG. 4.

Figure 3:
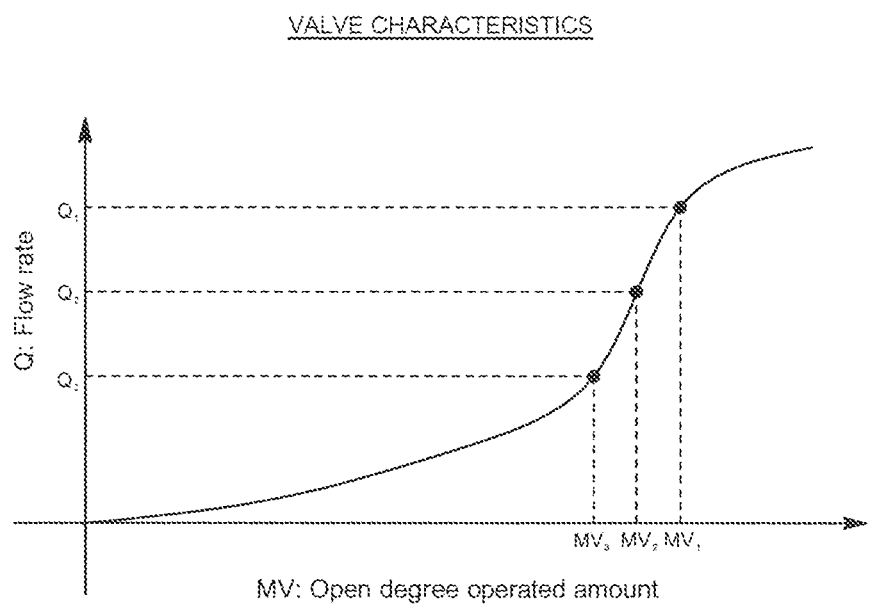
FIG. 3 is a graph showing a valve characteristic of a pressure control valve in the first embodiment.

Furthermore, the open degree operated amount of the pressure control valve 2 that can deliver the flow rate (Q) necessary for realizing the set pressure value $P_{set}$ calculated by the expression 2 can be determined by referring to a valve characteristic diagram showing a relationship between the open degree operated amount and the flow rate as shown in FIG. 3.

In the first embodiment, the open degree operated amount is obtained by referring to the valve characteristic diagram as shown in FIG. 3 by the use of the flow rate (Q) necessary for calculation by the expression 2 in a case where the set pressure value is given is set as the upper limit value of the open degree operated amount to each set pressure value.

Figure 5:
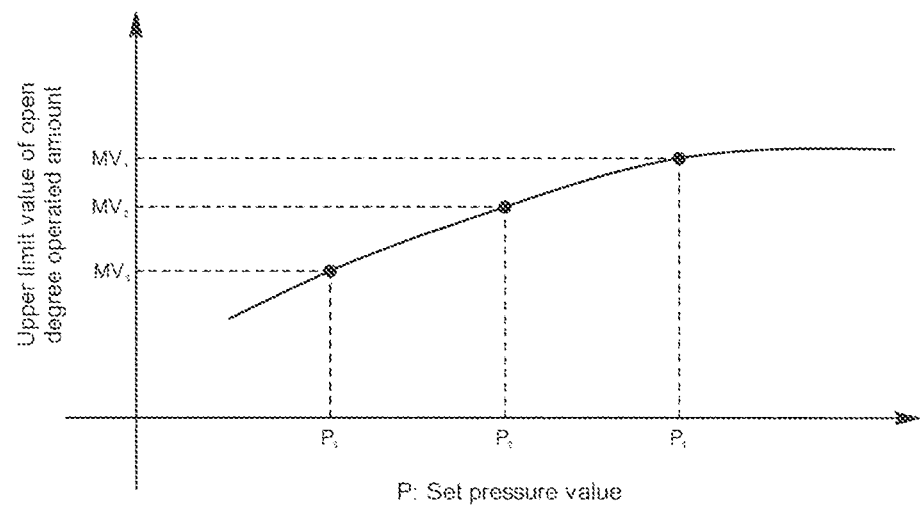
FIG. 5 is a graph showing a relationship between the set pressure value and an upper limit value of an open degree operated amount in the first embodiment.

As mentioned above, since the relationship between the set pressure value and the necessary flow rate is linear as shown in FIG. 4 and the relationship between the open degree operated amount of the pressure control valve 2 and the flow rate is non-linear as shown in FIG. 3, the limiter part 32 sets the upper limit value of the open degree operated amount having a non-linear relation as shown in FIG. 5 to each set pressure value.

Furthermore, as is clear from FIG. 5, the limiter part 32 is configured to set the upper limit value both so that the larger the set pressure value as a whole is, the larger the upper limit value of the open degree operated amount changes, and so that the larger the set pressure value is, the smaller the change ratio of the upper limit value of the open degree operated amount to the set pressure value is.

In addition, the limiter part 32 varies the upper limit value of the open degree operated amount set to each set pressure value by the volume of the chamber 5 as shown by the expression 2. Concretely, as is clear from the expression 2, since the larger the volume (V) of the chamber 5 is, the larger the necessary flow rate (Q) becomes, the limiter part 32 also sets the upper limit value of the open degree operated amount larger as the volume (V) of the chamber 5 becomes larger.

<Operation of the Device>

Figure 6:
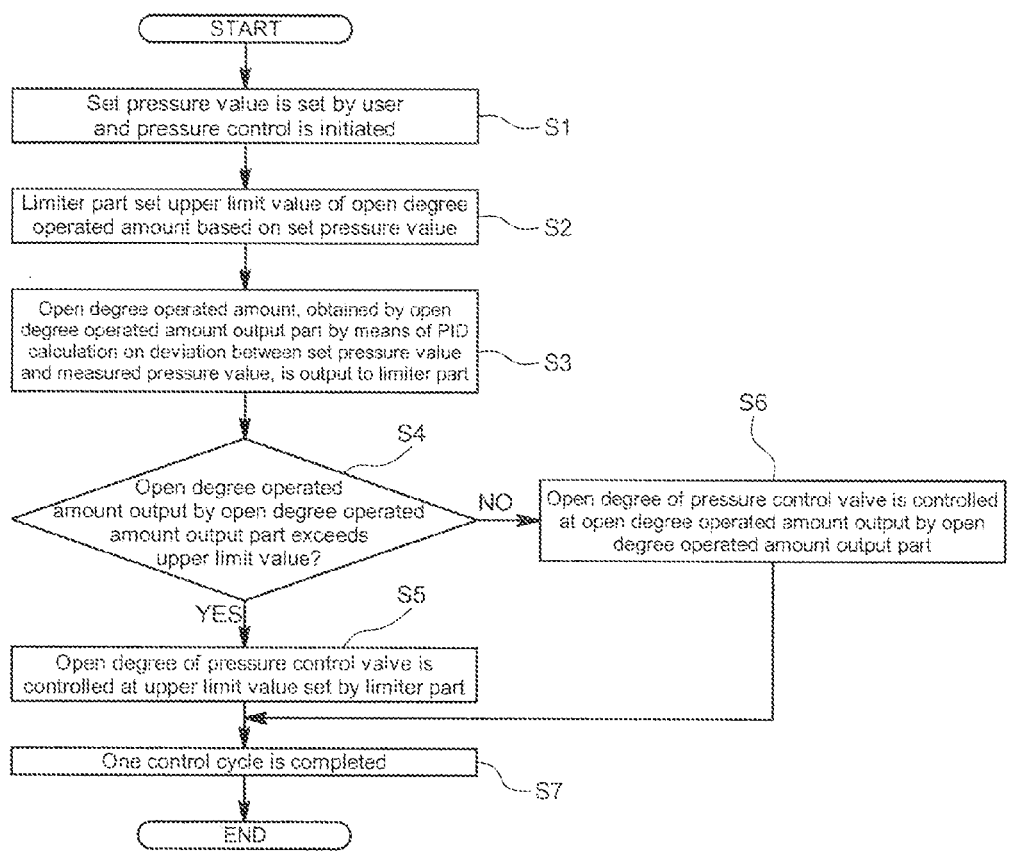
FIG. 6 is a flow chart showing an operation of the pressure control device in the first embodiment.

An operation of the pressure control device 100 having the above-mentioned arrangement will be explained with reference to a flow chart in FIG. 6.

First, when the pressure control is initiated after the set pressure value is set by a user (Step S1), the limiter part 32 sets the upper limit of the open degree operated amount corresponding to the set pressure value (Step S2).

Next, the open degree operated amount output part 31 conducts a PID calculation on the deviation between the set pressure value and the present measured pressure value and outputs the open degree operated amount (Step S3).

The limiter part 32 judges whether the open degree operated amount output by the open degree operated amount output part 31 is larger than the upper limit value set by the limiter part 32 or not (Step S4).

In a case where the open degree operated amount output by the open degree operated amount output part 31 exceeds the upper limit value, the limiter part 32 controls the pressure control valve 2 by the upper limit value of the open degree operated amount (Step S5). Meanwhile, in a case where the open degree operated amount output by the open degree operated amount output part 31 is smaller than the upper limit value, the pressure control valve 2 is controlled at the open degree operated amount output by the open degree operated amount output part 31 (Step S6). As mentioned, the pressure control valve 2 is controlled at the open degree operated amount and the control of one control cycle is completed (Step S7).

When the next control cycle is initiated, the operation of the step S3~step S7 is again repeated.

An operation of the pressure control device 100 during a period from the initial state to a time when a generally target response time passes, namely, in the transition state will be described further more in detail. Since the deviation between the set pressure value and the measured pressure value is large during the period from the initial state to the steady state, the value of the open degree operated amount that is obtained by conducting the PID calculation on the deviation and that is output by the open degree operated amount output part 31 is also large so that the output open degree operated amount is in a state of exceeding the upper limit value set by the limiter part 32 generally on a constant basis.

As a result of this, during the period when the deviation is big while the period from the pressure control initiation time to the time until generally the target response time passes, the open degree of the pressure control valve 2 is continuously controlled substantially at the upper limit value set for every set pressure value by the limiter part 32.

Meanwhile, since the deviation between the set pressure value and the measured pressure value becomes extremely small in a terminal end part approaching the steady state in the transition state or in the steady state, the open degree operated amount output by the open degree operated amount output part 31 becomes smaller than the upper limit value so that it is possible to continue the control in accordance with the deviation with high responsiveness.

<Effect>

In accordance with the pressure control device 100 of the first embodiment having the above-mentioned arrangement, since the upper limit value of the open degree operated amount is set by the limiter part 32 in accordance with each set pressure value, the open degree operated amount is limited by the upper limit value in accordance with the set pressure value regardless of the state wherein the deviation is big like in the transition state even though the PID coefficient set by the open degree operated amount output part 31 is set at a large value so that the pressure control valve 2 is not controlled at an excessive open degree. Accordingly, it is possible to restrain overshoot or ringing in a state of high gain where the PID coefficient is large whatever the set pressure value is.

Furthermore, since there is no need of repressing the PID coefficient to a small value in consideration of the overshoot or ringing in the transition state, it is possible to improve the responsiveness in the steady state and to make the control system insusceptible to disturbance.

In addition, since the PID coefficient in the open degree operated amount output part 31 can be fixed regardless of the set pressure value, it is possible to simplify the control system compared with the control system wherein the PID coefficient is appropriately changed in accordance with the set pressure value, thereby reducing the cost.

Figure 7:
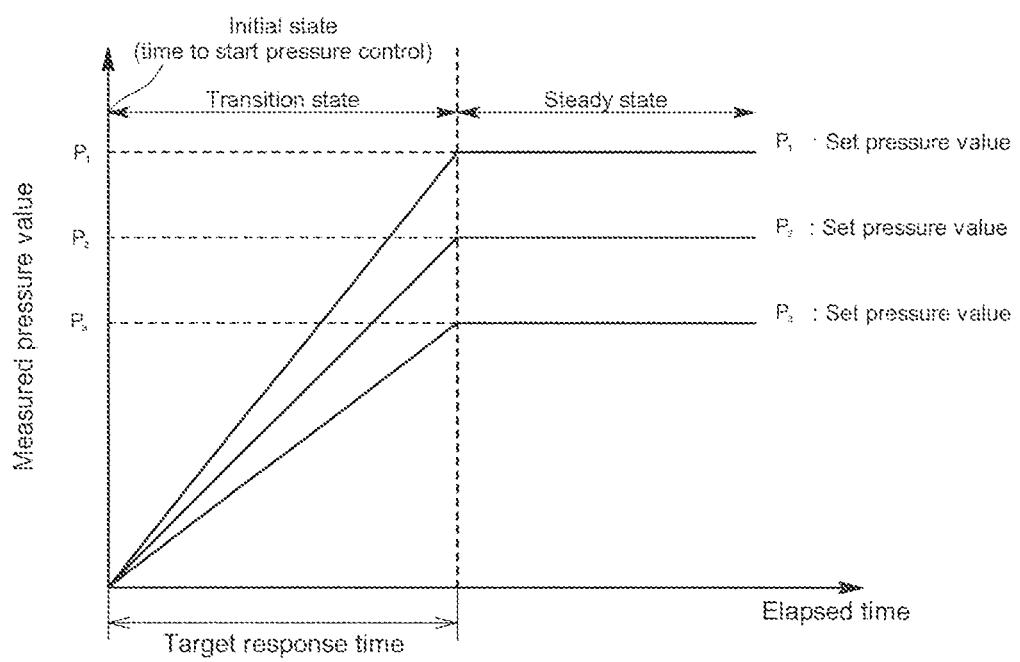
FIG. 7 is a graph showing one example of a pressure control result by the pressure control device in the first embodiment.

Furthermore, since the upper limit value of the open degree operated amount set for each set pressure value by the limiter part 32 is set at the open degree operated amount of the pressure control valve 2 corresponding to the flow rate (Q) of the fluid necessary to achieve the set pressure value obtained by the target response time (tr), the volume (V) of the chamber 5 and the set pressure value, it is possible to equalize the time period from the initial state to the steady state at a generally target response time (tr) irrespective of the set pressure value shown in FIG. 7.

More concretely, in a case where there are $P_1$, $P_2$ and $P_3$ in order of descending magnitude as the set pressure value, the corresponding flow rates $Q_1$, $Q_2$, $Q_3$ to be filled into the chamber 5 in order to reach the set pressure value in the target response time (tr) as shown in FIG. 4 is calculated from the expression 2, and the open degree operated amounts $MV_1$, $MV_2$, $MV_3$ to the pressure control valve 2 corresponding to the flow rates $Q_1$, $Q_2$, $Q_3$ are selected in the valve characteristic diagram in FIG. 3 and set as the upper limit value $MV_1$, $MV_2$, $MV_3$, respectively. Accordingly, the non-linearity of the volume (V) of the chamber 5 and the valve characteristic of the pressure control valve 2 are accounted for in the upper limit value. Furthermore, in a case where each of the set pressure values $P_1$, $P_2$, $P_3$ is set, the open degree of the pressure control valve 2 is controlled continuously at the corresponding upper limit values $MV_1$, $MV_2$, $MV_3$ of the open degree operated amount in the transition state where the deviation is big. As is clear from the back calculation of the expression 2, since the time period from the initial state to the steady state becomes the target response time (tr) for the corresponding set pressure values $P_1$, $P_2$, $P_3$, it is possible to equalize the time period while the transition state continues irrespective of the set pressure value.

Modified Embodiment

Figure 8:
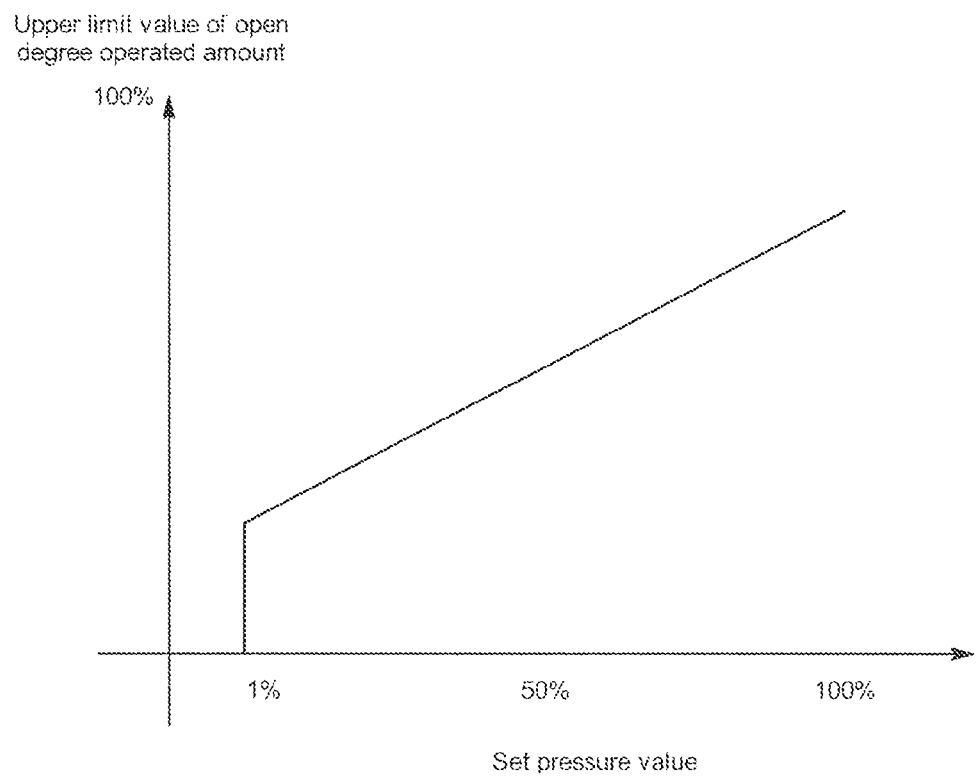
FIG. 8 is a graph showing a relationship between a set pressure value and an open degree operated amount in a modified embodiment of the pressure control device in the first embodiment.

A modified embodiment of the first embodiment will be explained. In the first embodiment, the upper limit value of the open degree operated amount is set accounting for the non-linearity of the valve characteristic of the pressure control valve 2, however, the upper limit value of the open degree operated amount may be set by the limiter part 32 in proportion to the set pressure value as shown by a graph in FIG. 8 depending on a required accuracy. With this arrangement, it is possible to constitute a control system with further more simple arrangement while having an inhibitory effect on the overshoot or ringing.

Furthermore, the upper limit value (the limit value) set in accordance with the set pressure value by the limiter part 32 may be corrected in accordance with a differential pressure between the pressure in the upstream side of the pressure control valve 2 and the pressure in the downstream side of the pressure control valve 2. More concretely, a primary pressure sensor (not shown in drawings) is arranged in the upstream side of the pressure control valve 2 so that the limiter part 32 receives the differential pressure value between the measured pressure value of the primary pressure sensor and the measured pressure value of the pressure sensor 1 and the correction amount is changed based on the differential pressure value. More specifically, in a case where the differential pressure is large, the limiter part corrects the upper limit value of the open degree operated amount so as to be smaller than that of the ordinary case. In a case where the differential pressure is small, the limiter part corrects the upper limit value of the open degree operated amount so as to be larger than that of the ordinary case. With this arrangement, it becomes easier to realize both the responsiveness of the pressure control and the stability by setting the upper limit value that also takes into consideration of the easiness of flowing of the fluid due to the pressure in the upstream side and the downstream side of the pressure control valve 2.

Next, a second embodiment of this invention will be explained.

Figure 9:
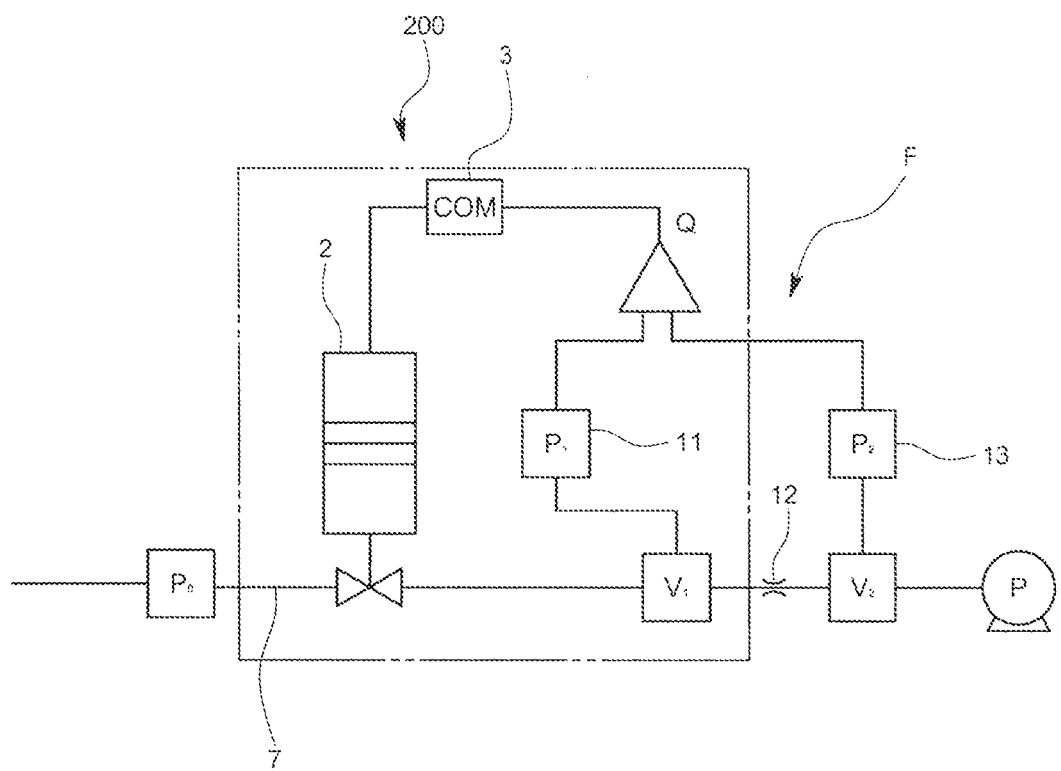
FIG. 9 is a schematic showing a flow rate control device in a second embodiment.
Figure 10:
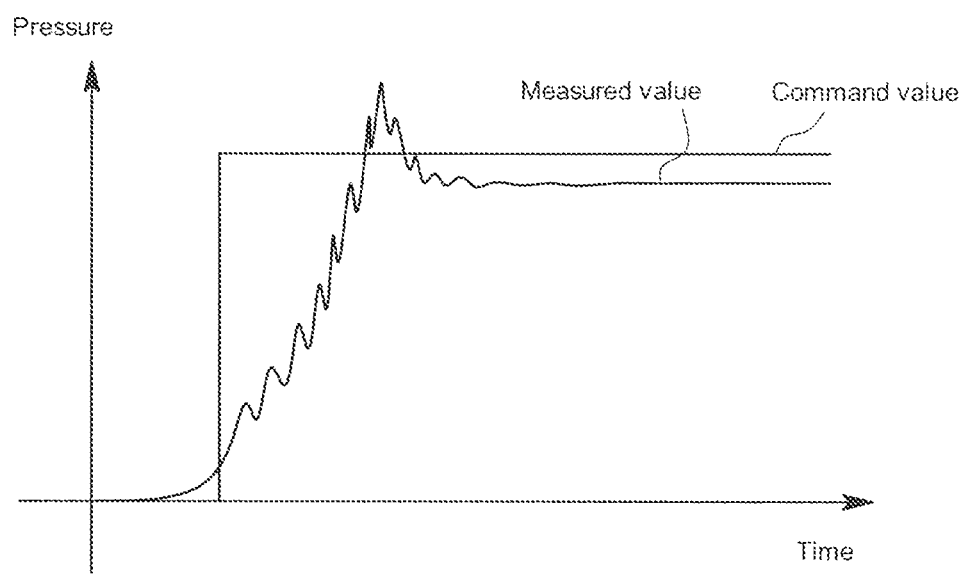
FIG. 10 is a graph showing a problem that is generated in a case that a PID coefficient is made large in a conventional pressure control device.

A flow rate control device 200 in accordance with the second embodiment of this invention comprises, as shown in FIG. 9, a flow rate control valve 2, an upstream side pressure sensor 11, a fluid resistor 12 such as an orifice to produce a pressure loss, and a downstream side pressure sensor 13 from the upstream side in this order. The upstream side pressure sensor 11, the fluid resistor 12 and the downstream side pressure sensor 13 constitute a flow rate sensor (F) that outputs the measured flow rate value base on, for example, the Hagen-Poiseuille equation. The flow rate control device 200 further comprises a valve control part 3 that controls the flow rate control valve 2 so as to make the measured flow rate measured by the flow rate sensor (F) at the set flow rate.

In this second embodiment, a pump serving as a vacuum source is connected downstream of the downstream side pressure sensor 13 so that the pressure in the downstream side of the fluid resistor 12 is maintained generally constant in a vacuum state. Accordingly, the measured flow rate value output by the flow rate sensor (F) is generally determined only by the measured pressure value output by the upstream side pressure sensor 11.

As a result of this, it is also possible for the configuration of this embodiment to serve as a pressure control device that controls the pressure at a target set flow rate value by controlling the measured pressure value in the upstream side of the fluid resistor 12 at the set pressure value corresponding to the set flow rate value in a portion shown by an imaginary line in FIG. 9. Then, in a case of no valve control part, similar to a problem of the conventional pressure control device, in a case where the PID coefficient is set at a large value so as to shorten the response time, if a small value of the set flow rate value is set, ringing or overshoot might be generated.

The value for feed-back used by the valve control part 3 in the first embodiment is the pressure value, and the pressure value is changed to the flow rate value for the valve control part 3 in the second embodiment.

Concretely, the valve control part 3 comprises an open degree operated amount output part 31 that outputs an open degree operated amount of the flow rate control valve 2 based on the measured flow rate value and the set flow rate value and a limiter part 32 that sets a tolerance of the open degree operated amount by setting an upper limit value (a limit value) of the open degree operated amount and that controls the flow rate control valve 2 by the open degree operated amount of the upper limit value in a case where a value of the open degree operated amount output by the open degree operated amount output part 31 is out of the tolerance, and is characterized in that the limiter part 32 sets the upper limit value of the open degree operated amount in accordance with the set flow rate value.

In accordance with this arrangement, similar to the case of the pressure control in the first embodiment, it is possible also for the flow rate control on a basis of pressure to maintain the response time from the initial state to the steady state at the target response time regardless of the size of the set flow rate value and to prevent overshoot or ringing.

A modified embodiment of the second embodiment will be explained.

In the second embodiment, an example is explained wherein the pressure in the downstream side of the fluid resistor 12 is maintained at a generally constant value, an the pressure in the upstream side of the fluid resistor 12 predominates during controlling the flow rate, however, the present claimed invention can be applied to a case that the pressure in the downstream side of the fluid resistor 12 fluctuates and the same effect as that of the second embodiment can be obtained.

In addition, the flow rate sensor (F) in the second embodiment consists of the upstream side pressure sensor 11, and the fluid resistor 12 made of the orifice and the downstream side pressure sensor 13, however, the flow rate sensor (F) may consist of the upstream side flow rate sensor 11 and a sonic nozzle as the fluid resistor 12 alone. In addition, also in a case where the sonic nozzle is used as the fluid resistor 12, the downstream side pressure sensor 13 may be further provided. With this arrangement, it is possible to conduct the flow rate control preferably similar to the second embodiment.

Another embodiment will be explained.

In the first embodiment and the second embodiment, the pressure sensor is arranged in the downstream side of the valve, however, the order of this arrangement is not especially limited, and for example, the pressure sensor and the valve may be arranged in this order from the upstream side.

It is acceptable as long as the upper limit value of the open degree operated amount set by the limiter part varies at least according to the set pressure value, and in some cases, the upper limit value may not be reflected by the volume in the downstream side of the pressure control valve.

In addition, the limit value of the open degree operated amount set by the limiter part is not limited to the upper limit value, and may be the lower limit value. For example, in a case where the pressure is dropped from a predetermined pressure value by means of the pressure control device, it is possible to prevent the under shoot or ringing and to maintain the response time from the initial state to the steady state regardless of the set pressure value by setting the lower limit value of the open degree operated amount according to the set pressure value by means of the limiter part.

Furthermore, a case of increasing the pressure from a state that the pressure in the initial state is zero to the set pressure value is explained in the first embodiment, however, a pressure control device of this invention may be used to raise the pressure from a state wherein a predetermined initial pressure value is maintained in the initial state to the set pressure value.

In this case, the upper limit value set by the limiter part may be the open degree operated amount of the pressure control valve according to the flow rate value of the fluid necessary for raising the pressure that is calculated by the use of the value of the pressure used in the expression 1 and the expression 2 as the value obtained by subtracting the initial pressure value from the set pressure value. In addition, the calculation expression to determine the upper limit value is not limited to the expression shown in the first embodiment, and the upper limit value may be calculated based on, for example, the relational expression between the specified flow rate and the pressure. Furthermore, the upper limit value of the open degree operated amount may be so set that the open degree operated amount output by the open degree operated amount output part exceeds the upper limit value generally in all of the area of the transition state, or may be so set that the open degree operated amount exceeds only in one part of the area of the transition state. In other words, the upper limit value of the open degree operated amount that is suitable for the target responsive time or the responsive characteristic in the required transition state may be set by the limiter part.

In addition to the PID control, other control methods such as, for example, the PI control may be used in the open degree operated amount output part, and the control method is not especially limited. In short, it may be acceptable as long as the open degree operated amount is output based on the deviation between the set pressure value and the measured pressure value. In each of the above-mentioned embodiments, the open degree operated amount output part directly calculates the value corresponding to the absolute value of the open degree of the control valve and outputs the calculated value to the limiter part, however in a case where, for example, the open degree operated amount output part calculates the change amount from the open degree at the moment based on the deviation, a value obtained by adding the change amount to the open degree at the moment may be output to the limiter part. More specifically, in a case where the open degree operated amount is output as the absolute value, the open degree operated amount is input to the limiter part as is. In a case where the change amount of the open degree is output as the incremental change, the absolute value is obtained by adding the change amount to the open degree at that moment and the limiter part judges whether or not the absolute value falls within the tolerance specified by the limit value.

For example, in a case where the pressure control function equivalent to this invention is to be added later to, for example, an existing pressure control device, the programs may be installed in a computer or the like by the use of the recording medium having the programs that implement the function as the valve control part. The recording media refers to, for example, an actual media such as a CD-ROM or a DVD-ROM.

In accordance with this arrangement, since there is a portion where a predetermined volume is formed in the flow channel to control the pressure or the flow rate, it takes time to fill the fluid into the predetermined volume, or it takes time to flow out the fluid. Then, it is possible to improve the response characteristic in spite of the transition state wherein the stability of the control is lost if just gain is increased for improving the responsiveness. Accordingly, it is possible to preferably apply this invention to the pressure control device or the flow rate control device whose requirement for the transient response is especially strict.

The present claimed invention may be variously modified or combined with embodiments without departing from a spirit of the invention.

POSSIBLE APPLICATIONS IN INDUSTRY

In accordance with the present claimed invention, it is possible to provide the pressure control device or the flow rate control device wherein overshoot is not generated in spite of the large response wherein the gain of the PID coefficient is set large, used for, for example, the semiconductor manufacturing device.

The invention claimed is:

1. A pressure control device comprising
a pressure sensor that measures a pressure of a fluid flowing in a flow channel,
a pressure control valve arranged in the flow channel, and
a valve control part that controls the pressure control valve so as to make a measured pressure value measured by the pressure sensor at a set pressure value, wherein
the valve control part comprises an open degree operated amount output part that outputs an open degree operated amount of the pressure control valve based on the measured pressure value and the set pressure value, and
a limiter part that sets a tolerance of the open degree operated amount by setting a limit value of the open degree operated amount and that controls the pressure control valve at the open degree operated amount of the limit value in a case where the open degree operated amount output by the open degree operated amount output part is out of the tolerance, and
the limiter part sets the limit value of the open degree operated amount according to the set pressure value.

2. The pressure control device described in claim 1, wherein
the limiter part is so configured that an upper limit value is set as the limit value of the open degree operated amount, and
in a case where the open degree operated amount that is output by the open degree operated amount output part is equal to or less than the upper limit value, the limiter part controls the pressure control valve at the open degree operated amount output by the open degree operated amount output part.

3. The pressure control device described in claim 2, wherein
the limiter part is configured so that the larger the set pressure value is, the larger the upper limit value of the open degree operated amount is set.

4. The pressure control device described in claim 2, wherein
the limiter part is so configured to set the open degree operated amount that corresponds to a flow rate value necessary to achieve a pressure in a volume in the downstream side of the pressure control valve to be the set pressure value at a time when a target time period passes after a time when the pressure control is initiated as the upper limit value.

5. A recording medium having programs used for a pressure control device comprising a pressure sensor that measures a pressure of a fluid flowing in a flow channel and a pressure control valve arranged in the flow channel, and is characterized by comprising
a valve control part that controls the pressure control valve so as to make a measured pressure value measured by the pressure sensor at a set pressure value, wherein
the valve control part comprises an open degree operated amount output part that outputs an open degree operated amount of the pressure control valve based on the measured pressure value and the set pressure value, and
a limiter part that sets a tolerance of the open degree operated amount by setting a limit value of the open degree operated amount and that controls the pressure control valve at the open degree operated amount of the limit value in a case where the open degree operated amount output by the open degree operated amount output part is out of the tolerance, and
the limiter part sets the limit value of the open degree operated amount according to the set pressure value.

6. A flow rate control device comprising
a pressure sensor that measures a pressure of a fluid flowing in a flow channel,
a flow rate control valve arranged in the flow channel, and
a valve control part that controls the flow rate control valve so as to make a measured flow rate value calculated based on a measured pressure value measured by the pressure sensor at a set flow rate value, wherein
the valve control part comprises an open degree operated amount output part that outputs an open degree operated amount of the flow rate control valve based on the measured flow rate value and the set flow rate value, and
a limiter part that sets a tolerance of the open degree operated amount by setting a limit value of the open degree operated amount and that controls the flow rate control valve at the open degree operated amount of the limit value in a case where the open degree operated amount output by the open degree operated amount output part is out of the tolerance, and
the limiter part sets the limit value of the open degree operated amount according to the set flow rate value.

7. A recording medium having programs used for a flow rate control device comprising a pressure sensor that measures a pressure of a fluid flowing in a flow channel and a flow rate control valve arranged in the flow channel, and is characterized by comprising
a valve control part that controls the flow rate control valve so as to make a measured flow rate value calculated based on a measured pressure value measured by the pressure sensor at a set flow rate value, wherein
the valve control part comprises an open degree operated amount output part that outputs an open degree operated amount of the flow rate control valve based on the measured flow rate value and the set flow rate value, and
a limiter part that sets a tolerance of the open degree operated amount by setting a limit value of the open degree operated amount and that controls the flow rate control valve at the open degree operated amount of the limit value in a case where the open degree operated amount output by the open degree operated amount output part is out of the tolerance, and the limiter part sets the limit value of the open degree operated amount according to the set flow rate value.

* * * * *